United States Patent
Brostmeyer

(10) Patent No.: US 7,770,376 B1
(45) Date of Patent: Aug. 10, 2010

(54) DUAL HEAT EXCHANGER POWER CYCLE

(75) Inventor: Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 874 days.

(21) Appl. No.: 11/655,706

(22) Filed: Jan. 19, 2007

Related U.S. Application Data

(60) Provisional application No. 60/761,285, filed on Jan. 21, 2006.

(51) Int. Cl.
F02G 1/00 (2006.01)

(52) U.S. Cl. ............... 60/39.182; 60/791; 60/39.17; 60/650; 60/682

(58) Field of Classification Search .......... 60/39.182, 60/39.183, 39.181, 791, 39.17, 39.511, 650, 60/655, 682, 683
See application file for complete search history.

(56) References Cited

U.S. PATENT DOCUMENTS

| | | | |
|---|---|---|---|
| 2,401,285 A | 5/1946 | Woodward et al | |
| 2,691,271 A | 10/1954 | McDevitt | |
| 3,832,845 A * | 9/1974 | Aguet | 60/39.182 |
| 4,326,382 A | 4/1982 | Baardson | |
| 4,369,624 A | 1/1983 | Hamm et al. | |
| 4,492,085 A * | 1/1985 | Stahl et al. | 60/649 |
| 4,894,984 A | 1/1990 | Papastavros | |
| 4,896,499 A | 1/1990 | Rice | |
| 4,922,709 A * | 5/1990 | Hendriks | 60/39.183 |
| 5,165,239 A * | 11/1992 | Bechtel et al. | 60/683 |
| 5,212,941 A | 5/1993 | Croonenbrock et al. | |
| 5,313,782 A | 5/1994 | Frutschi et al. | |
| 5,386,688 A | 2/1995 | Nakhamkin | |
| 5,544,479 A * | 8/1996 | Yan et al. | 60/39.183 |
| 5,634,327 A | 6/1997 | Kamber et al. | |
| 5,647,199 A | 7/1997 | Smith | |
| 5,664,414 A | 9/1997 | Bronicki et al. | |
| 5,687,559 A | 11/1997 | Sato | |
| 5,689,948 A | 11/1997 | Frutschi | |
| 5,704,206 A | 1/1998 | Kaneko et al. | |
| 5,775,091 A | 7/1998 | Bannister et al. | |
| 5,934,065 A | 8/1999 | Bronicki et al. | |
| 5,956,937 A | 9/1999 | Beichel | |

(Continued)

Primary Examiner—Michael Cuff
Assistant Examiner—Young Choi
(74) Attorney, Agent, or Firm—John Ryznic

(57) ABSTRACT

A power plant for burning a fuel in a low pressure combustion chamber to produce electrical power. A first compressor supplies compressed air through a first heat exchanger to add heat to the compressed air. The heated compressed air is passed through a first turbine to drive a first electric generator. The first turbine outlet is passed through a second heat exchanger in series with the first heat exchanger to further heat the compressed air. The compressed air is then passed through a second turbine to drive a second electric generator and produce electric power. The outlet from the second turbine is passed through a first combustor to produce the hot gas flow through the second heat exchanger. The outlet from the second heat exchanger is passed through a second combustor before passing through the first heat exchanger. The outlet from the first heat exchanger is passed through a heat recovery steam generator to generate steam to drive another turbine and another generator. An additional compressor and intercooler can be used to supply the compressed air to the first heat exchanger. With this system, one or more fuels can be burned under low pressure and without passing the contaminants from combustion through the turbines.

3 Claims, 3 Drawing Sheets

U.S. PATENT DOCUMENTS

| | | |
|---|---|---|
| 6,038,848 A | 3/2000 | Frutschi |
| 6,050,080 A | 4/2000 | Horner |
| 6,079,197 A | 6/2000 | Attia |
| 6,141,953 A | 11/2000 | Mongia et al. |
| 6,260,349 B1 | 7/2001 | Griffiths |
| 6,269,626 B1 | 8/2001 | Kim |
| 6,378,287 B2 | 4/2002 | Griffiths |
| 6,543,214 B2 | 4/2003 | Sasaki et al. |
| 6,640,548 B2 | 11/2003 | Brushwood et al. |
| 6,817,187 B2 | 11/2004 | Yu |
| 7,266,940 B2 * | 9/2007 | Balan et al. ............... 60/39.181 |
| 2004/0098966 A1 * | 5/2004 | Dewis ..................... 60/39.511 |

* cited by examiner

DUAL HEAT EXCHANGER POWER CYCLE

CROSS-REFERENCE TO RELATED APPLICATIONS

This application claims the benefit to a U.S. Provisional Application No. 60/761,285 filed on Jan. 21, 2006. This application is also related to a pending Regular U.S. patent application Ser. No. 11/176,163 filed on Jul. 7, 2005 and entitled DUAL FUEL COMBINED CYCLE POWER PLANT incorporated herein by reference.

BACKGROUND OF THE INVENTION

1. Field of the Invention

The present invention relates to a gas turbine power plant in which two distinct fuels are used to produce steam delivered to the turbines.

2. Description of the Related Art Including Information Disclosed Under 37 CFR 1.97 and 1.98

Coal has been used as a fuel source in power plants that produce steam, the steam being used to drive a turbine and produce electrical power. The efficiency of a gas turbine engine is related to the temperature of the gas flow into the turbine. Higher gas temperatures result in higher efficiencies. Coal can produce very high temperatures in the resulting gas stream. However, the coal exhaust contains fine particulate matter and corrosive residue that can damage turbines. One theoretical solution to this problem is to use a heat exchanger to transfer heat from the coal gas stream to a gas turbine stream. However, modern metal heat exchangers cannot operate at high enough temperatures to makes this practical. The use of ceramic heat exchangers has been considered, since ceramic materials can withstand higher temperatures than modern metallic materials. However, ceramic heat exchangers do not have high heat transfer rates (as compared to metal material heat exchangers) to make this practical, or the cost of the ceramic material heat exchangers are very high and therefore prohibitive for use as a cost effective alternative to metal heat exchangers. With the price of petroleum relate fuels rising, there is a continuing need to use coal as a fuel source to drive a gas turbine engine. The present invention attempts to solve the problem of using a metallic material heat exchanger and a coal fired near atmospheric pressure combustor to produce a gas stream for a gas turbine engine in order to produce electrical power. In the present invention, the combustor is at near atmospheric pressure and therefore can be used to combust any fuel such as coal or biomass that requires low pressure to burn. Also, the present invention delivers no contaminants from the combustion process into the turbine. Also, more than one type of fuel can be burned in the twin combustor arrangement of the present invention.

U.S. Pat. No. 2,401,285 issued to Woodward et al on May 28, 1946 shows a gas turbine system which uses two distinct fuels and a heat exchanger to transfer heat from one of the burners to a gas flow leading into a turbine, but unlike the present invention the Woodward invention does not produce power from the gas flow out of the main furnace. In the Woodward invention, the main furnace is used to provide heat to dry the fuel (garbage with high moisture content) fed to this main furnace.

U.S. Pat. No. 2,691,271 issued to McDevitt on Oct. 12, 1954 shows a waste heat power plant including an air turbine cycle that burns a high moisture content fuel and an oil or gas based fuel is burned in the same boiler to produce a continuous and substantially uniform stream of high temperature gaseous products of combustion which are utilized for the preheating to a high temperature of compressed air subsequently expanded through an air turbine for the generation of electric power, the high temperature exhaust air from the turbine being utilized for the rapid drying and burning of the primary solid fuel and burning of the supplementary fuel.

U.S. Pat. No. 5,704,206 issued to Kaneko et al on Jan. 6, 1998 shows a coal burner combined power plant includes a gas turbine for burning coal in a furnace under the pressure and uses produced gas. A steam turbine is combined with an exhaust gas boiler using exhaust gas from the gas turbine. Another fuel is burned at an inlet of the gas turbine for allowing the temperature at the inlet of the gas turbine to rise. A fuel reformer reforms the other fuel and is located within the furnace. In the Kaneko patent, the non-coal combustion product is not delivered from a turbine into the coal burning combustor, and two heat exchangers are used.

U.S. Pat. No. 6,640,548 issued to Brushwood et al on November 2003 shows a gas turbine (12) capable of combusting a low quality gaseous fuel having a ratio of flammability limits less than 2, or a heat value below 100 BTU/SCF. A high quality fuel is burned simultaneously with the low quality fuel to eliminate instability in the combustion flame. A sensor (46) is used to monitor at least one parameter of the flame indicative of instability. A controller (50) having the sensor signal (48) as input is programmed to control the relative flow rates of the low quality and high quality fuels. When instability is detected, the flow rate of high quality fuel is automatically increased in relation to the flow rate of low quality fuel to restore stability.

U.S. Pat. No. 4,326,382 issued to Baardson on Apr. 27, 1982 shows an indirect gas turbine power plant is provided which includes primary and secondary combustors wherein fuel is burned and heat is conveyed to a turbine working medium which is subsequently passed through the turbine section of a gas turbine. The gas turbine includes both a compressor section and a turbine section. The primary combustor has a first inlet for receiving exhaust air from the turbine section, a second inlet for receiving fuel and an outlet for the discharge of products of combustion. The secondary combustor includes a first inlet for receiving at least a portion of the products of combustion from the primary combustor, a second inlet for receiving a portion of the products of combustion of the secondary combustor, and an outlet for the discharge of the products of combustion of the secondary combustor. An air heat exchanger for conveying heat from the products of combustion to the compressed air is positioned within the secondary combustor. This heat exchanger includes an inlet for receiving compressed air from the compressor section of the gas turbine, and an outlet to direct the compressed, hot air out of the secondary combustor for passage to the turbine section.

U.S. Pat. No. 5,934,065 issued to Bronicki et al on Aug. 10, 1999 shows an apparatus for generating power includes a gas turbine unit having a compressor for compressing ambient air and producing compressed air, a combustion chamber to which the compressed air is supplied, a source of relatively high grade fuel for burning in the combustion chamber and producing combustion gases, and a gas turbine connected to generator and to the compressor for expanding the combustion gases and producing exhaust gases. The apparatus further includes a combustor that burns relatively low grade fuel, and produces combustion products, and an indirect contact heat exchanger responsive to the combustion products for heating the compressed air before the latter is applied to the combustion chamber, and for producing cooled combustion products. In addition, an energy converter is provided having an organic working fluid responsive to the exhaust gases for converting heat in the exhaust gases to electricity. Finally, the apparatus of the invention serves to minimize the consumption of high grade fuel in the presence of changes in the heating value of the low grade fuel.

U.S. Pat. No. 4,896,499 issued to Rice on Jan. 30, 1990 show a compression inter-cooled gas turbine and vapor bottoming combined cycle system with the gas turbine operating at 30 to 65 atmospheres is disclosed. A twin spool hot gas generator incorporates compression inter-cooling at the optimum intercooler pressure ratio to (a) minimize intercooler heat rejection degradation, (b) raise the overall cycle pressure ratio, (c) increase gas generator core mass flow and (d) to increase the gas turbine power output. The gas turbine can operate in either the simple cycle or the reheat cycle mode for optimum combined cycle efficiency.

U.S. Pat. No. 5,647,199 issued to Smith on Jul. 15, 1997 shows a combined-cycle multi-pressure reheat system employs a plurality of power generation units each having a gas turbine, a high-pressure steam turbine, a generator, a compressor and a heat recovery steam generator with a re-heater. In its simplest single-shaft form, high-pressure steam is supplied to the high-pressure steam turbine and exhaust steam there from is supplied to a re-heater of the HRSG. Intermediate-pressure steam from the intermediate section of the HRSG combines with the cold reheat steam for heating in the re-heater section. The hot reheat steam is supplied from each power generation unit to the inlet of an intermediate pressure steam turbine. Low-pressure steam from a low-pressure section of the HRSG is supplied to a header where it combines with exhaust steam from the intermediate-pressure turbine to drive a low-pressure turbine. The intermediate and low-pressure turbines may be coupled to a common generator. The gas turbine may be steam cooled by routing exhaust steam from the high pressure steam turbine to the gas turbine and exhausting spent cooling steam to the intermediate pressure steam turbine.

U.S. Pat. No. 6,269,626 issued to Kim on Aug. 7, 2001 shows a combined cycle cogeneration power plant includes a combustion turbine formed by an inlet for receiving fuel, an inlet for receiving air, a combustor for burning the combustion fuel and the air, and an outlet through which hot gaseous combustion product is released; a regenerative fuel heating system formed by a plurality of heat exchangers for transferring heat to combustion fuel for heating the combustion fuel, and modulating control valves for controlling temperature of the combustion fuel; a heat recovery steam generator (HRSG) connected to the outlet of the combustion turbine for receiving the gaseous combustion product. The HRSG is formed by a plurality of heat exchangers including steam/water drums, each having a surface blow down connection, and evaporators connected to the steam/water drums, a water inlet connected with the heat exchangers of the HRSG, a steam outlet, and a stack for releasing the exhausted gaseous combustion product. A steam turbine is provided, and has a steam inlet for receiving steam from the steam outlet of the HRSG, and an exhaust steam outlet; a condenser is connected to the exhaust steam outlet of the steam turbine for condensing steam to a liquid condensate; at least one pump is provided for supplying the liquid condensate from the condenser to the HRSG; and at least one pump is provided for supplying feed water from at least one drum to the HRSG. A conventional-type power plant with a regenerative fuel heating system is also disclosed.

U.S. Pat. No. 6,050,080 issued to Horner on April 18, 200 shows a system for cooling hot section components of a gas turbine engine. The cooling system includes a plurality of compressors, or compression train, and an intercooler disposed between each adjacent pair of compressors so as to achieve the desired pressure and temperature of the cooling air at reduced shaft power requirements. The first stage of compression may be provided by the booster, or low pressure compressor, of the engine, with the first intercooler receiving all of the air discharging from the booster. After exiting the first intercooler, a first portion of the booster discharge air is routed to the engine high pressure compressor and a second portion is routed to an inlet of the second compressor of the cooling air compression train. The compressed, cooled air exiting the last, downstream one of the compressors is used for cooling at least a first hot section component of the engine.

U.S. Pat. No. 5,313,782 issued to Frutschi et al on May 24, 1994 shows a combined gas/steam power station plant which consists essentially of a fossil-fired gas turbine group and a steam circuit, with an exhaust heat boiler (11) in between, inter-cooling and reheat are provided to maximize the efficiency. The gas turbine group consists of two compressors (1, 2), of two combustion chambers (7, 9) and of two turbines (8, 10). Downstream of the first compressor (1), there is an intercooler (3) and on the cool side of this is placed an evaporator (4) which is in effective connection with the intercooler. The steam quantity formed in the evaporator (4) is introduced into a turbine (6) of the steam circuit, the result of this being a first improvement in efficiency. Downstream of the first turbine (8), there is a second combustion chamber (9) in which the exhaust gases from the first turbine (8) are processed to produce hot gases for the second turbine (10). The large calorific potential still present in the exhaust gases from this second turbine (10) flows through the exhaust heat boiler (11) in which a maximized steam power is produced, the result of which is the second improvement in efficiency.

U.S. Pat. No. 5,664,414 issued to Bronicki et al on September 1997 shows an apparatus for generating power includes a gas turbine unit having a compressor for compressing ambient air and producing compressed air, a combustion chamber to which the compressed air is supplied, a source of relatively high grade fuel for burning in the combustion chamber and producing combustion gases, and a gas turbine connected to generator and to the compressor for expanding the combustion gases and producing exhaust gases. The apparatus further includes a combustor that burns relatively low grade fuel, and produces combustion products, and an indirect contact heat exchanger responsive to the combustion products for heating the compressed air before the latter is applied to the combustion chamber, and for producing cooled combustion products. In addition, an energy converter is provided having an organic working fluid responsive to the exhaust gases for converting heat in the exhaust gases to electricity. Finally, the apparatus of the invention serves to minimize the consumption of high grade fuel in the presence of changes in the heating value of the low grade fuel.

An object of the present invention is to produce electric power from burning a dirty fuel and using the heat generated from the combustion to drive a turbine.

Another object of the present invention is to produce electric power from a low pressure combustion process and drive a turbine.

Another object of the present invention is to use a series of combustors and heat exchangers to drive a series of turbines in order to generate a higher efficiency using a higher overall pressure ratio.

DETAILED DESCRIPTION OF THE INVENTION

Figure 1:
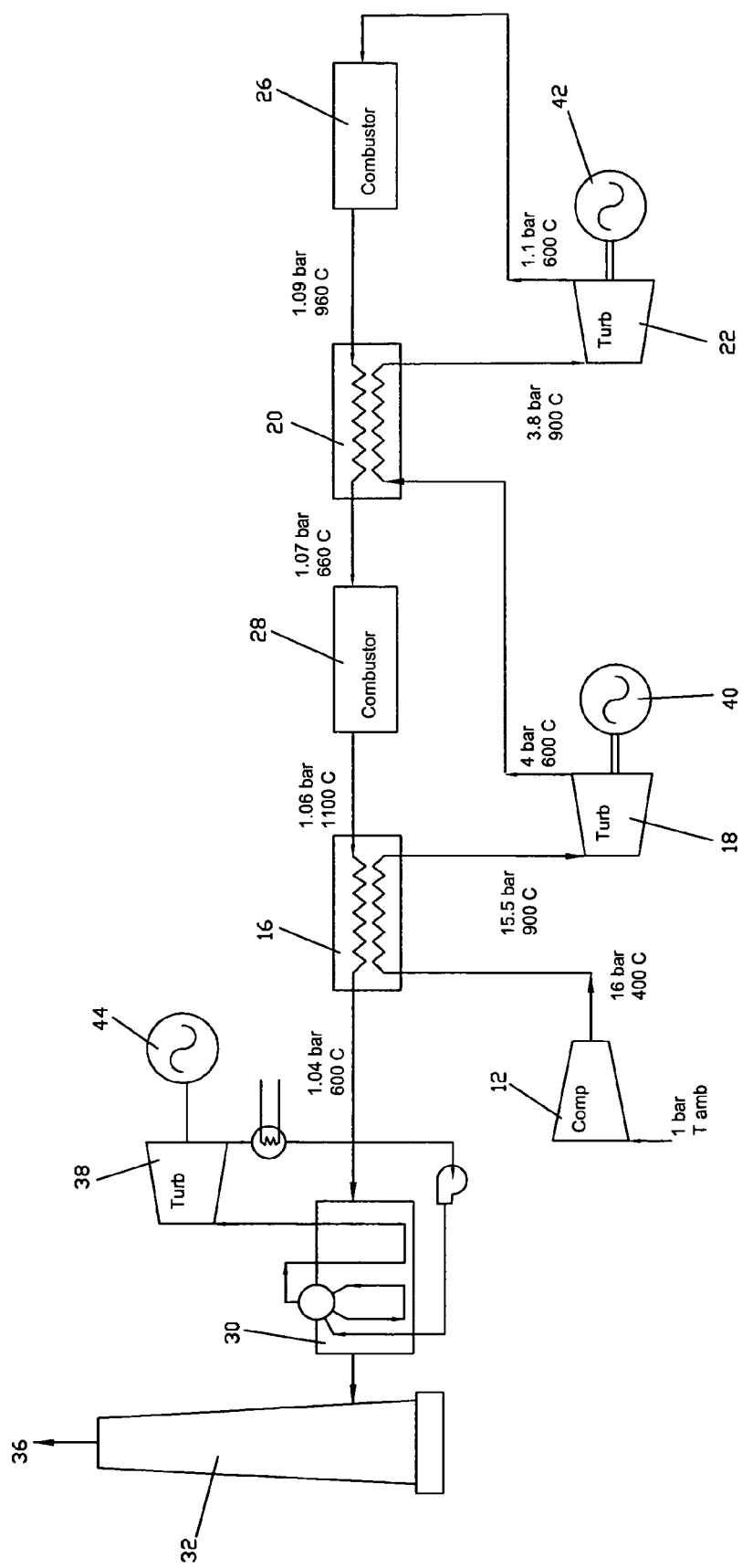
FIG. 1 shows the Dual Heat Exchanger Power Cycle with a compressor to deliver compressed air to the power cycle.

The present invention shown in FIG. 1 includes a compressor 12 to take air from atmospheric pressure and temperature and increase the pressure and temperature to 16 bar and 400 degrees C. respectively. The compressed air is passed through a first heat exchanger 16 where the compressed air picks up heat to 900 C before entering a first turbine 18. Compressed air at 16 bar and at 900 C drives the first turbine 18 which drives a first electrical generator 40 and produces electrical power.

The compressed air exiting the first turbine 18 at a pressure of 4 bar and a temperature of 600 C enters a second heat exchanger 20, where the compressed air picks up additional heat and exits at a pressure of 3.8 bar and a temperature of 900 C. This compressed air enters a second turbine 22, which drives a second electrical generator 42 to produce additional electric power. The compressed air exiting the second turbine at 1.1 bar and at 600 C enters a first combustor 26 which burns a fuel such as coal, biomass or any other well known heat generating source to increase the temperature of the air to 960 C. The air exiting the first combustor 26 enters the second heat exchanger 20 where the heat from the first combustor 26 is added to the compressed air entering the second turbine 22.

The air exits the second heat exchanger 20 at 660 C, and enters a second combustor 28 where the air picks up additional heat to reach a temperature of 1100 C. The second combustor 28 burns the same fuel as the first combustor. However, the two combustors can burn different fuel. The heated air exiting the second combustor 28 enters the first heat exchanger 16 in which the added heat is transferred to the compressed air entering the first turbine 18. The air exiting the first heat exchanger at 1.05 bar and 600 C still contains a high amount of heat energy. In order to improve the overall efficiency of the power plant, the exhaust air at 600 C from the first heat exchanger 16 is used in a heat recovery steam generator (HRSG) 30 to produce steam which is then used to drive a third turbine 38. The third turbine 38 drives a third electrical generator 44 to produce additional electrical power. The exhaust from the HRSG is then dumped to atmosphere as waste 36 through a stack 32. Use of the twin combustors and twin heat exchangers in series provides for a higher efficiency of the power system because of the higher overall pressure ration. The combustors are burning the fuels at atmospheric pressure so no pressurized combustor is required. Also, the combustors can be used to burn any fuel such as coal or biomass that does not require high pressure for combustion as in a gas turbine engine. Also, the present invention allows for burning a fuel high in contaminants such as coal that would damage a turbine without passing the hot combustion gas flow through a turbine.

Figure 2:
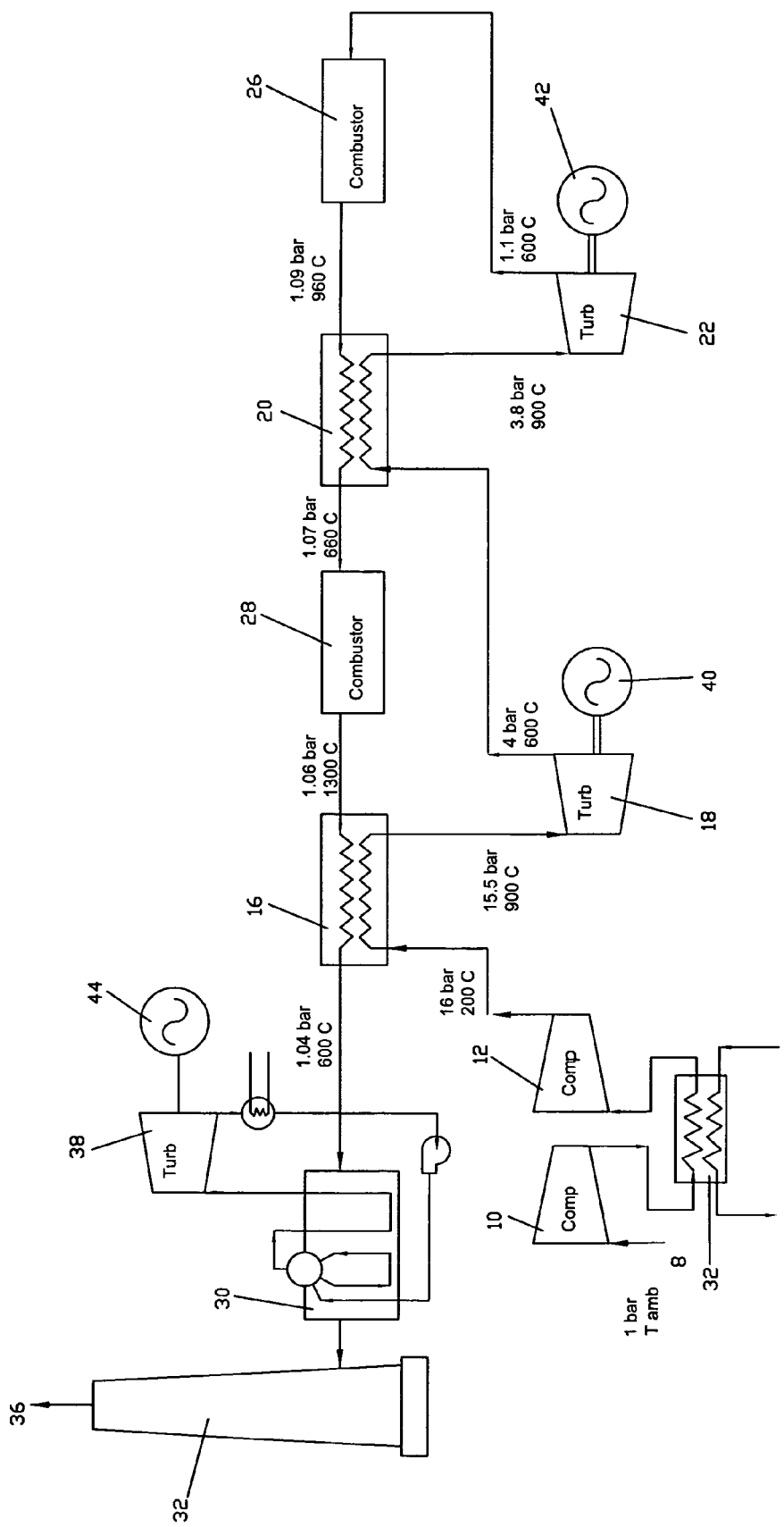
FIG. 2 shows the Dual Heat Exchanger Power Cycle with an intercooler used in a multiple compressor assembly to deliver compressed air to the power cycle.

A second embodiment of the present invention is shown in FIG. 2. The single compressor 12 used in the FIG. 1 embodiment is replaced with a dual compressor assembly that makes use of an intercooler 32. A first compressor 10 compresses ambient air to a pressure and temperature passes the compressed air through the intercooler 32, and into a second compressor 12 which increases the pressure to 16 bar and the temperature to 200 C before entering the first heat exchanger. The process after the compressor is the same as in the FIG. 1 embodiment except the temperature out of the compressor of the FIG. 2 embodiment is 200 degrees C. less than the temperature out of the compressor of the FIG. 1 embodiment. Since the temperature going into the first heat exchanger is less in the FIG. 2 embodiment, and it is desirable to have the exhausted air that enters the HRSG 30 be at 600 C, more heat must be added in the first heat exchanger. Thus, the second combustor 28 increases the air temperature to 1300 C before entering the first heat exchanger 16.

Figure 3:
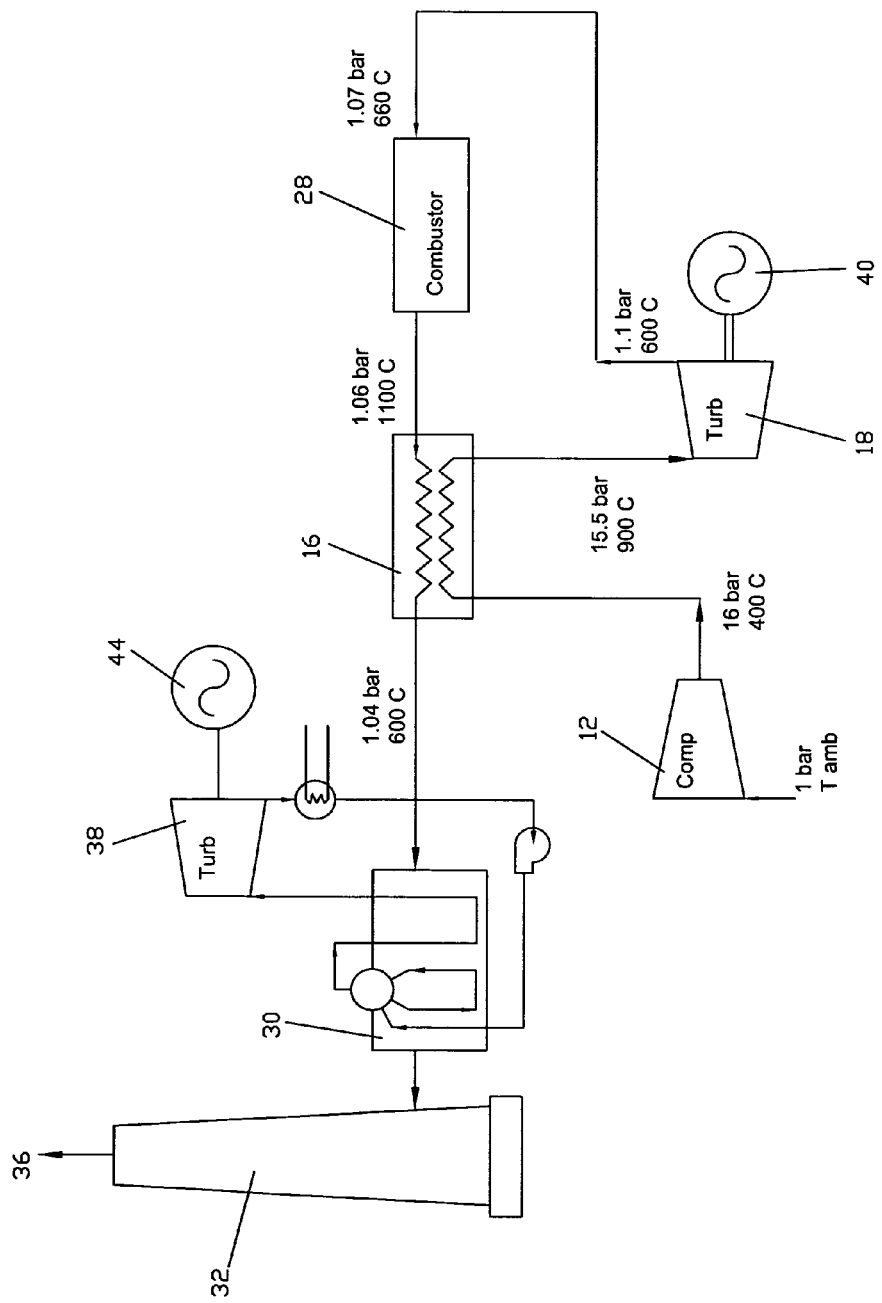
FIG. 3 shows a third embodiment of the present invention which uses a single heat exchanger and a single combustor.

FIG. 3 shows a second embodiment of the present invention. The FIG. 3 embodiment is similar to the FIG. 1 embodiment but does not make use of the second turbine, the second combustor, and the second heat exchanger. The FIG. 3 embodiment uses a single heat exchanger to heat the compressed air before passing the hot compressed air into the turbine to drive the generator. The turbine exhaust enters the combustor to produce the hot gas flow that enters the heat exchanger. The hot gas flow exiting the heat exchanger is then passed into the HRSG to produce steam to drive the turbine 38. A fourth embodiment could also be formed by modifying the third embodiment of FIG. 3 to include the intercooler 32 shown in FIG. 2 with the two compressor 10 and 12 that deliver the compressed air to the heat exchanger and turbine of FIG. 3.

I claim the following:

1. A power plant for generating electric power comprising:

a compressor to compress air at atmospheric pressure to a high pressure;

a heat exchanger connected to the compressor such that the compressed air from the compressor passes through the heat exchanger;

a first turbine connected to the heat exchanger such that the compressed air passing through the heat exchanger passes into the first turbine for expansion of the compressed air;

a first electrical generator rotatably connected to the first turbine;

an atmospheric pressure combustor connected to the turbine outlet;

the heat exchanger connected to the combustor outlet such that a hot gas flow from the combustor passes through the heat exchanger to transfer heat from the combustion gas to the compressed air;

a heat recovery steam generator connected to the hot gas outlet of the heat exchanger to generate steam from the hot gas flow from the heat exchanger;

a second turbine connected to the heat recovery steam generator to use the steam to drive the second turbine;

a second electrical generator connected to the second turbine to produce electric power;

a second heat exchanger connected upstream from the first combustor and connected to the first turbine such that the turbine outlet passes through the second heat exchanger;

a third turbine connected to the second heat exchanger such that the outlet of the first turbine is heated in the second heat exchanger and passed into the third turbine;

a third electric generator driven by the third turbine to produce electric power;

a second low pressure combustor connected to the outlet of the third turbine, the second low pressure combustor connected to the second heat exchanger such that the hot gas flow from the second combustor passes through the second heat exchanger to transfer heat to the compressed air passing into the third turbine; and, the two heat exchangers and two low pressure combustors being connected in series such that the combustion gas passes into the heat recovery steam generator.

2. The power plant of claim 1, and further comprising:
a second compressor to compress the air delivered into the first compressor; and,
a third heat exchanger to form an intercooler between the first and second compressors.

3. The power plant of claim 1, and further comprising:
a second compressor to compress the air delivered into the first compressor; and,
a second heat exchanger to form an intercooler between the first and second compressors.

* * * * *